(12) United States Patent
Feinberg et al.

(10) Patent No.: US 7,788,228 B2
(45) Date of Patent: Aug. 31, 2010

(54) RECURSIVE FILE BACKUP

(75) Inventors: Yaniv Feinberg, Redmond, WA (US);
Tzipi Butnaru, Redmond, WA (US);
Ramakrishna Pamarthi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 297 days.

(21) Appl. No.: 11/607,260

(22) Filed: Dec. 1, 2006

(65) Prior Publication Data

US 2007/0150679 A1 Jun. 28, 2007

Related U.S. Application Data

(63) Continuation of application No. 10/425,081, filed on Apr. 28, 2003, now Pat. No. 7,149,728.

(51) Int. Cl.
*G06F 7/00* (2006.01)
*G06F 17/00* (2006.01)

(52) U.S. Cl. ............. 707/640; 707/655; 707/656; 707/658; 707/659; 707/999.2; 714/6; 714/12

(58) Field of Classification Search .............. 707/102, 707/200, 203, 204; 711/161, 162
See application file for complete search history.

(56) References Cited

U.S. PATENT DOCUMENTS

| | | | |
|---|---|---|---|
| 5,745,902 A * | 4/1998 | Miller et al. | 707/200 |
| 5,907,837 A * | 5/1999 | Ferrel et al. | 1/1 |
| 6,757,698 B2 * | 6/2004 | McBride et al. | 1/1 |
| 7,395,281 B2 * | 7/2008 | Edwards | 707/203 |
| 2002/0052884 A1 * | 5/2002 | Farber et al. | 707/104.1 |
| 2002/0087588 A1 * | 7/2002 | McBride et al. | 707/204 |
| 2006/0149797 A1 * | 7/2006 | Chai et al. | 707/204 |

* cited by examiner

*Primary Examiner*—Mohammad Ali
*Assistant Examiner*—Angelica Ruiz
(74) *Attorney, Agent, or Firm*—Merchant & Gould, P.C.

(57) ABSTRACT

Methods and systems are provided for recursively backing up modified data files where only modified data files are backed up and that provide a user with an efficient way to determine which original files have been modified to allow the user to readily locate original files if the user is not satisfied with any modifications to the original files. A mirror memory structure is created, but only modified files are saved to the mirror memory structure and modified files bear the same names as original files to assist in easily locating original files.

24 Claims, 4 Drawing Sheets

RECURSIVE FILE BACKUP

RELATED APPLICATION

This utility patent application is a continuation of and claims the benefit under 35 United States Code §120 of U.S. patent application Ser. No. 10/425,081 entitled "Recursive File Backup" filed on Apr. 28, 2003, the disclosures of which are expressly incorporated by reference.

FIELD OF THE INVENTION

The present invention generally relates to recursive file backup. More particularly, the present invention relates to recursively backing up data files modified by an automated file modification application.

BACKGROUND OF THE INVENTION

Since the advent of the computer age, users have had the need to backup a variety of data files to prevent a loss of valuable data in the event of a loss or corruption of original files. Users routinely backup individual files, and often users or systems administrators backup entire computer system file directories where hundreds or thousands of files are backed up. Such gross backup methods generally save a new copy of each backed up file in the directory even if many of the files have not been modified since the last backup.

Software applications have been developed for automatically modifying a plurality of files in order to correct a certain type of problem or to affect a certain type of change to any file in a given memory directory or subdirectory requiring a correction or change. For example, a common problem with conventional or digital photography is the introduction of red dots over the pupils of photographic subjects. Software applications have been developed for scanning a directory of photographs to locate and correct any photograph with the described color deficiency. Unless the user is prompted at the correction or change of each file for saving each changed file, the entire directory of files may be saved as backup files even though only a few files may have been modified by the automated file modification application. Such a method is time consuming, consumes large amounts of memory space, and requires the users to review every backed up file to determine whether the modifications to individual files are satisfactory. On the other hand, if the user is prompted after the modification of any individual file to save the modified file, any efficiency gained from using an automated modification application is lost. In either case, if modified files are simply saved over (written over) the original files, then users have no way to re-modify the original files if the first modification is not satisfactory. That is, the user will have lost the original files.

Accordingly, there is a need for a method and system for recursively backing up modified data files that only backs up any modified data files and that provides a user with an efficient way to determine which original files have been modified to allow the user to readily locate one or more original files if the user is not satisfied with modifications. It is with respect to these and other considerations that the present invention has been made.

SUMMARY OF THE INVENTION

Embodiments of the present invention provide methods and systems for recursively backing up modified data files where only modified data files are backed up and that provide a user with an efficient way to determine which original files have been modified to allow the user to readily locate original files if the user is not satisfied with any modifications to the original files. Generally, a user launches an automated file modification application to scan all files of a selected computer memory location such as a specified directory or subdirectory. The user selects a starting point such as a particular directory or subdirectory. Once a starting point is selected, a mirror or directory or mirror subdirectory is designated where the mirror directory or subdirectory starting point is designated (named) by numerically incrementing the original directory or subdirectory name. Fore example, the mirror directory of an original directory designated as "pictures" may be designated as "pictures1" prior to actually creating the mirror directory or subdirectory for potential storage of modified files. A determination is made as to whether the designated mirror directory or subdirectory already exists, for example, whether "pictures1" already exists. If the designated mirror directory or subdirectory does exist, the designation is incremented numerically, for example, "pictures2." This process continues until the mirror directory or subdirectory designation is determined to be a new designation. Once a mirror directory or subdirectory designation is determined, the mirror directory or subdirectory is created in memory for potentially storing modified files.

A search of the original directory or subdirectory is next performed by the automated file modification application to locate a first file for subdirectory contained within the starting directory or subdirectory. Once a first file is obtained requiring modification according to the programming of the automated file modification application, for example a first picture having color deficiency that should be corrected according to automated picture correction application, the obtained file is corrected according to the modification application. Once the obtained file is corrected, the corrected file bearing the identical name as the original file is saved to the mirror directory or subdirectory. The original uncorrected file is maintained in the original directory or subdirectory. Once the modified file is saved, the modification application continues searching the starting directory or subdirectory to obtain the next file requiring modification in accordance with the modification application.

If during the scan of the starting directory or subdirectory, a subdirectory is located, a determination is made as to whether the scan process should commence on the located subdirectory based on user input. If yet another subdirectory is found within the located subdirectory, another determination will be made as to whether the next subdirectory should be scanned according to user input. If the user has elected to scan the first obtained subdirectory located in the starting directory or subdirectory, a mirror subdirectory is created under the first mirror directory or subdirectory creating a mirror directory to subdirectory structure of the original directory to subdirectory structure. The mirror subdirectory thus created is given an identical name as the original subdirectory such that the only directory or subdirectory in the mirror structure that is provided with a name numerically incremented from the original is the mirror directory or subdirectory of the starting directory or subdirectory.

Once the mirror subdirectory is thus created, the scanning process for files that are to be modified in accordance with the automated modification application is commenced on the original subdirectory corresponding to the newly created mirror subdirectory to locate any files within the original subdirectory that must be modified. If and when a file is obtained in the original subdirectory and is subsequently modified, the modified file is saved to the newly created mirror subdirectory bearing the identical name as the original file in the original subdirectory.

The described process may continue through each subdirectory embedded in a parent directory or subdirectory until all memory locations designated by the user have been scanned and modified, if required. A mirror memory structure is created that is structurally identical to the original memory structure where the starting directory or subdirectory has an identical name to its mirror counterpart in the original directory or subdirectory, but for the numerically incremented designation. All subdirectories and modified files below the mirror starting directory or mirror starting subdirectory bear the identical naming designations as their original counterparts in the original memory structure. Advantageously, only files that are actually modified by the automated modification application are saved to the mirror memory structure. Accordingly, the user only has to look to the mirror structure to review files that were actually modified. If the user determines that any modified file was modified unsuccessfully, the user may easily locate the original file because the original file will have the identical naming designation as the modified file, but the original file will be located in the original memory structure.

These and other features and advantages that characterize the present invention will be apparent from a reading of the following detailed description and a review of the associated drawings. It is to be understood that both the foregoing general description and the following detailed description are exemplary and explanatory only and are not restrictive of the invention, as claimed.

DETAILED DESCRIPTION

The following description of the present invention is made with reference to the above-described drawings wherein like numerals refer to like parts or components throughout the several figures. The present invention is directed to methods and systems for recursively backing up modified data files where only data files that are modified are backed up and that provides a user with an efficient way to determine which original files have been modified and allows the user to readily locate the original files if the user is not satisfied with any modifications to original files.

Operating Environment

Figure 1:
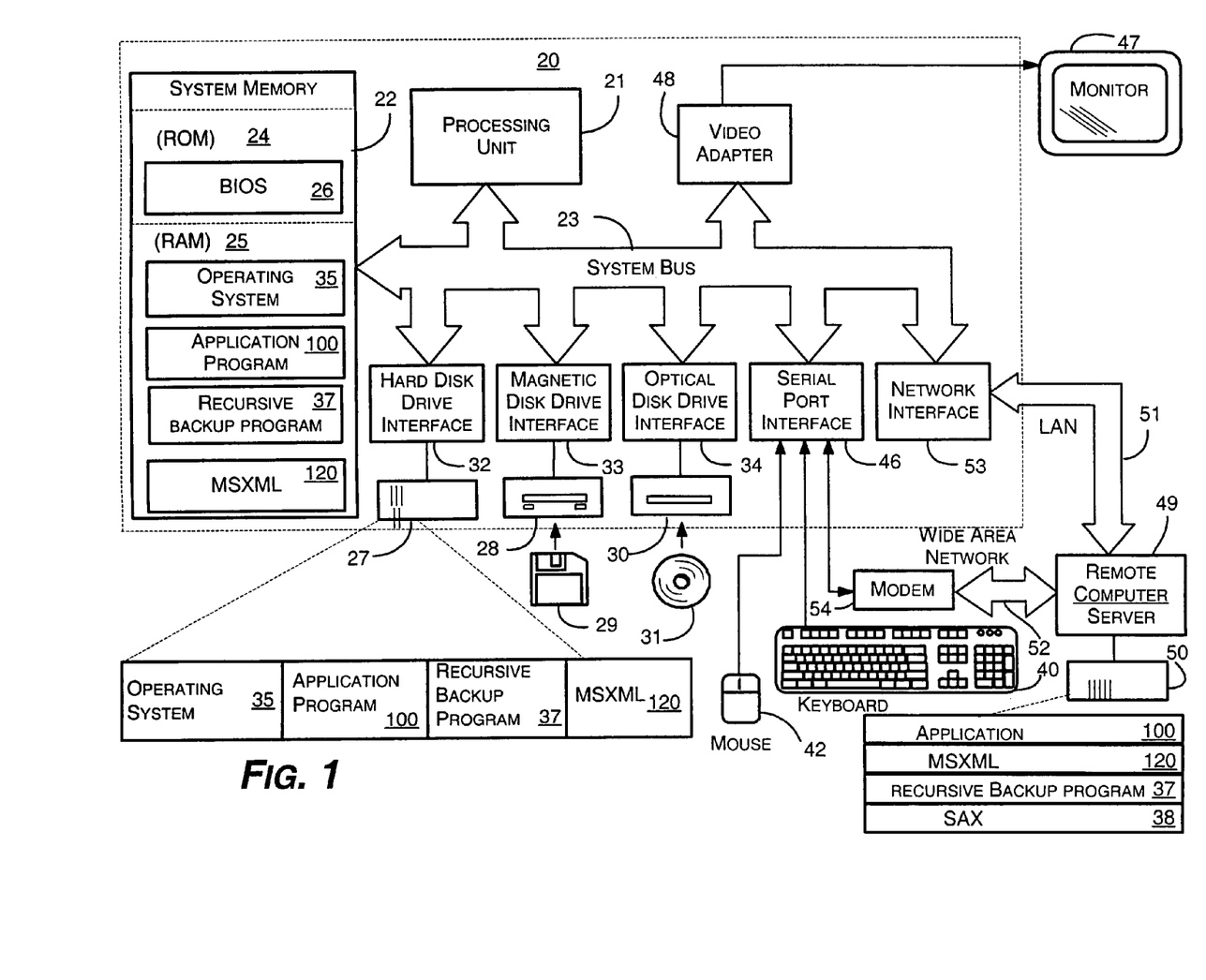
FIG. 1 is a block diagram of a computer and associated peripheral and networked devices that provide an exemplary operating environment for the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35 and one or more application programs 100, such as a spreadsheet application program, a word processor program, or other type of program module. According to embodiments of the present invention, an application program 100 may also include an automated file modification application 100. An example automated file modification program may include a program for scanning all photographs contained in a designated memory location for photographs requiring color enhancement. Once a file requiring modification is located, the modification is made, and the modified file is saved as described below. According to an embodiment of the present invention, a recursive backup program 37 is provided for recursively backing up modified files according to embodiments of the present invention. The recursive backup program may be a part of the automated file modification application 100, or the recursive backup program may be a separate program such as a dynamically-linked library (DLL) application that may be called by a number of other programs including the automated file modification application 100.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Operation

As briefly described above, according to embodiments of the present invention, when files are scanned and modified according to the functionality of an automated file modification application, a mirror memory structure of the originally scanned memory structure is created in which only modified files are saved. Accordingly, after all file modification is accomplished, the user may easily locate modified files by reviewing the mirror memory structure and the files contained therein.

Figure 2:
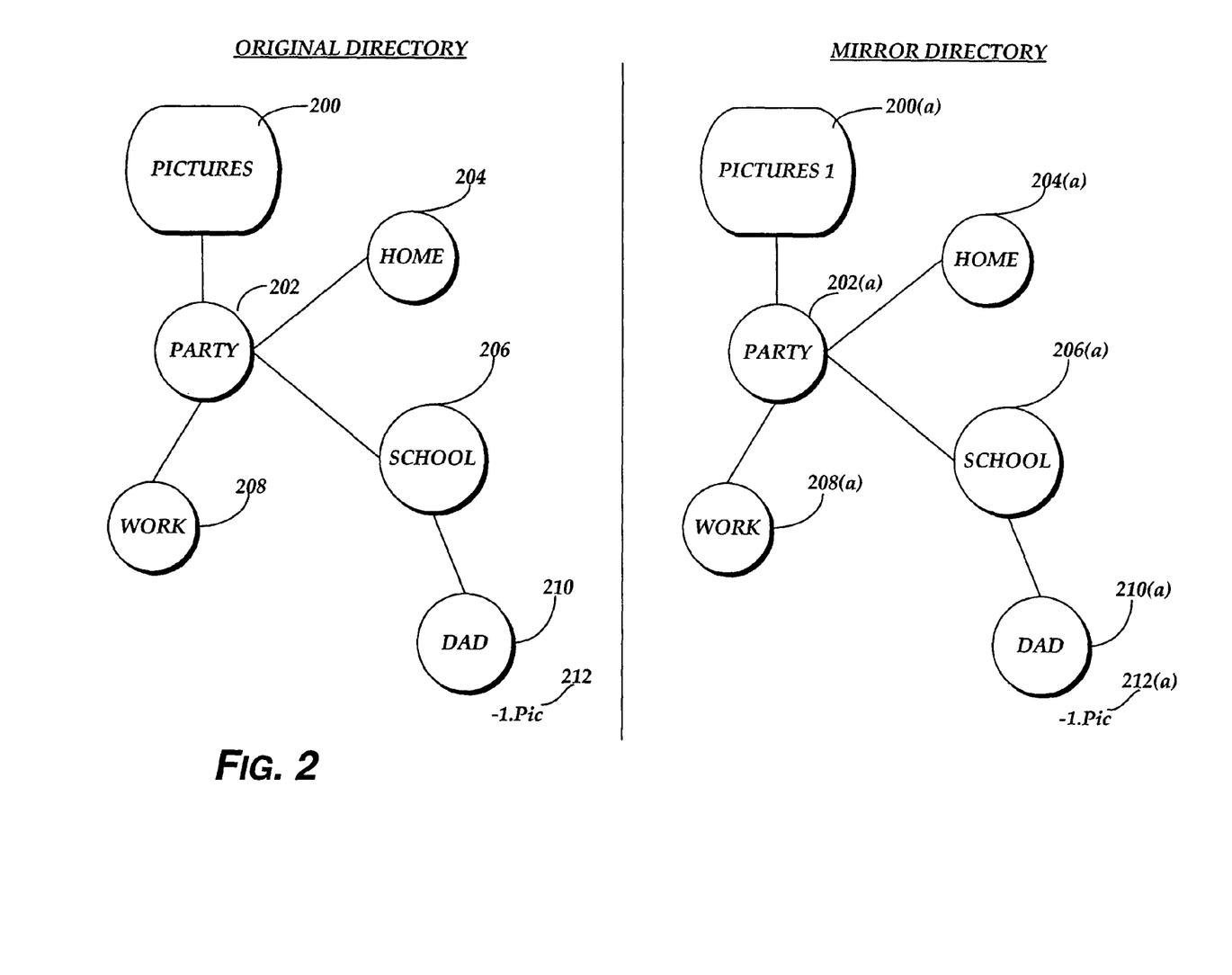
FIG. 2 is a simplified block diagram illustrating an original memory structure and illustrating a mirror memory structure of the original memory structure created in accordance with embodiments of the present invention.

FIG. 2 is a simplified block diagram illustrating an original memory structure and illustrating a mirror memory structure of the original memory structure created in accordance with an embodiment of the present invention. As shown in FIG. 2, an original directory memory structure is illustrated having a main directory "pictures" 200 and a first subdirectory "party" 202. Within the subdirectory 202 are three additional subdirectories 204, 206 and 208. Within the subdirectory 206 is another subdirectory 210. And, within the subdirectory 210 is a file 212 designated as "1.pic". As should be understood by those skilled in the art, description of the present invention in terms of an automated file modification program for automatically modifying picture files is by way of example only and is not limiting in anyway of the invention claimed herein. The functionality of the present invention is equally applicable to the saving of modified files modified by any program that scans one or more files and makes certain changes to those files. Accordingly, the directories and subdirectories illustrated in FIG. 2, and described below with reference to FIG. 3 may likewise be directories or subdirectories containing text documents, spreadsheet documents, database files, slide presentation files, and the like.

Referring still to FIG. 2, a mirror directory memory structure of the original directory memory structure is illustrated adjacent to the original directory memory structure. The mirror directory memory structure is identical to the original memory structure, but for the numerically incremented name for the starting directory location selected by the user to begin scanning files that require modification according to the automated file modification application utilized by the user. By way of example, if the user selects the "pictures" directory 200 from the original directory to begin scanning files that may require modification, the mirror directory structure will be created such that the mirror starting directory 200(*a*) is designated as "pictures1" and subdirectories created below the starting mirror directory 200(*a*) are designated with identical names as the original subdirectory names contained in the original directory memory structure, as illustrated in FIG. 2. According to embodiments of the present invention, the direction of file modification in terms of the branches of the tree-like original memory structure that are scanned by the automated file modification application is designated by the user. That is, if the user designates that the scan is only performed on the starting directory 200, the subdirectory 202, the subdirectory 206 and the subdirectory 210, then the mirror directory created in accordance with the present invention will be a mirror of only those directories and subdirectories scanned by the automated file modification application according to user selection.

As illustrated in FIG. 2, a file 212 designated as "1.pic" is modified by a selected file modification application. Because the original file "1.pic" is located in the subdirectory 210, the modified file is saved in the mirror subdirectory 210(*a*) and is given the identical name as the original file "1.pic." Accordingly, after the automated file modification process is complete, the user may quickly review the modified file "1.pic" under the mirror-starting directory "pictures1" in the mirror memory structure. If the modified file "1.pic" is not modified to the satisfaction of the user, the user may easily find the original file by simply finding the identical file designation "1.pic" in the original file directory under the original directory 200. According to embodiments of the present invention, if the user subsequently modifies files in the mirror directory thus created, the starting directory will be "pictures1" and the mirror starting directory for the new mirror directory will be numerically incremented to "pictures2." Thus the user may readily determine that the new mirror directory structure is two changes away from the original memory structure. As should be understood, if the user had originally selected the subdirectory 202 as a starting point for modifying files according to the user's automated file modification application, the corresponding mirror subdirectory 202(*a*) would become the starting point in the mirror directory and would be given a numerically incremented name such as "party1."

Figure 3:
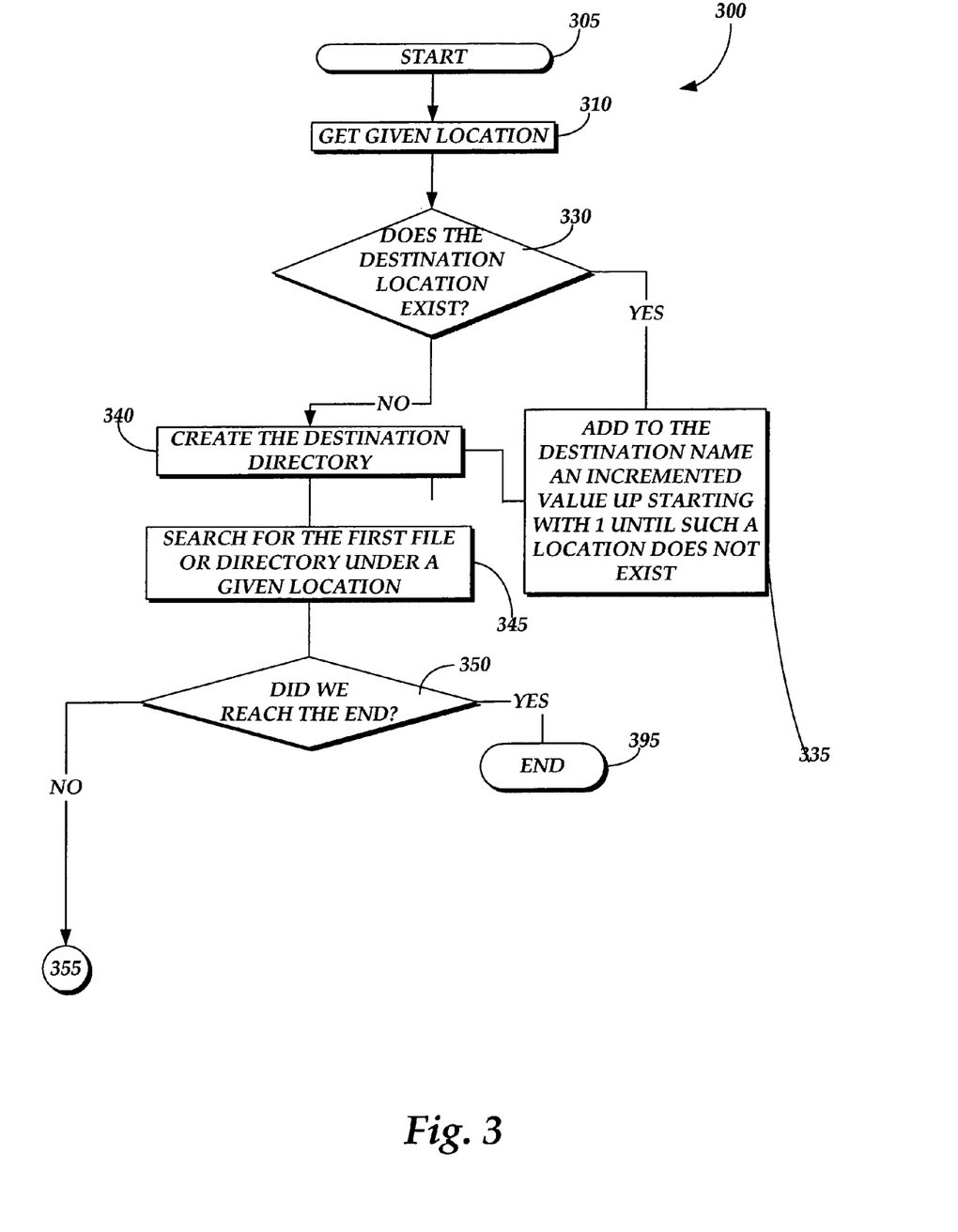
FIGS. 3 and 4 are flow diagrams illustrating a method for recursively backing up modified data files according to embodiments of the present invention.
Figure 4:
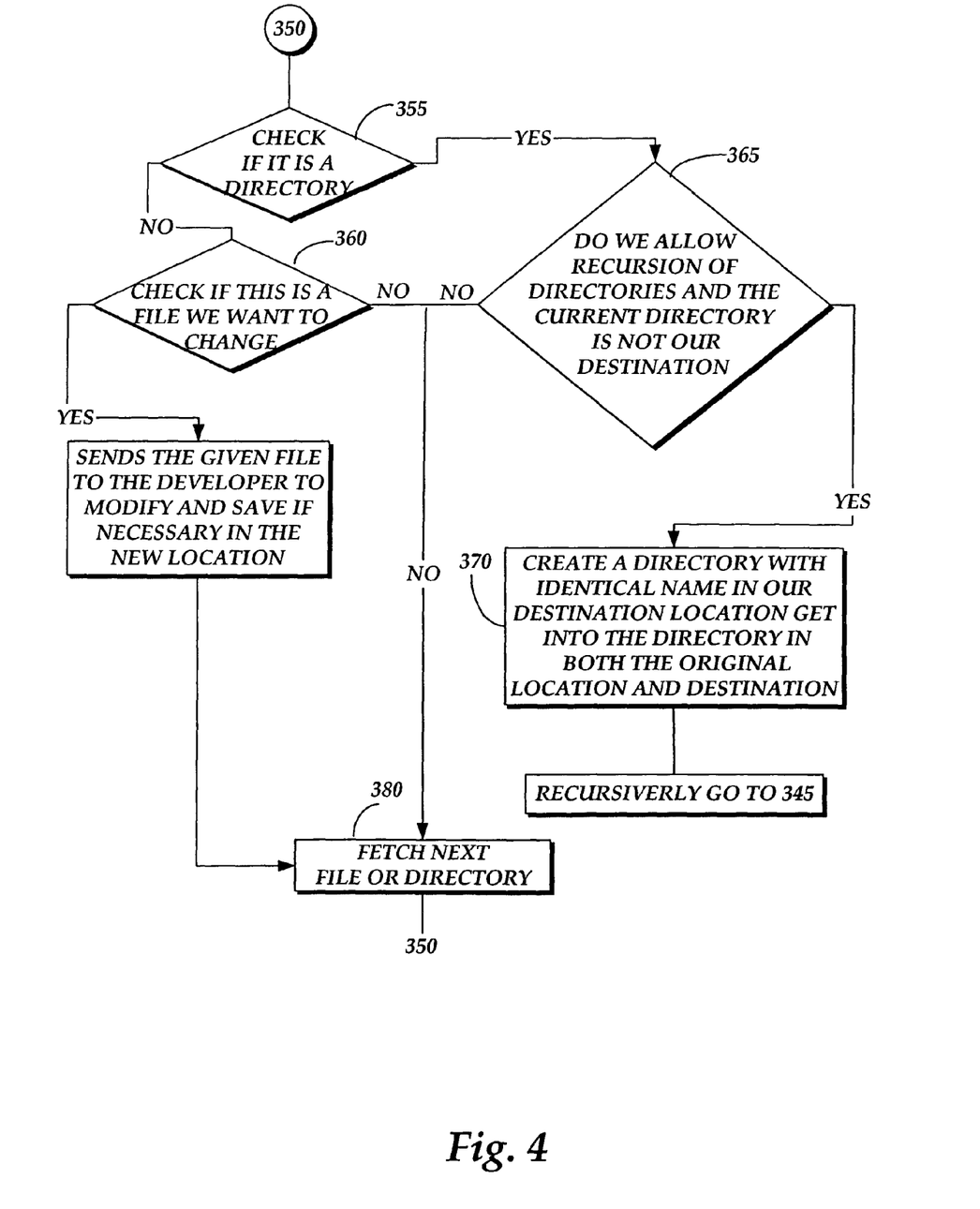

FIGS. 3 and 4 are flow diagrams illustrating a method for recursively backing up modified data files according to embodiments of the present invention. The method 300 begins at start step 305 and proceeds to step 310 where a user launches an automated file modification application 100, for example, an application for automatically correcting color deficiencies in a plurality of photograph files. As described above with referenced to FIG. 1, a recursive file backup program 37 is simultaneously launched to recursively backup files modified by the automated file modification application 100. At step 310, the user selects a starting memory location to commence scanning and modifying, files contained therein. For example, referring back to FIG. 2, the user may select as a starting location the directory 200 for entering a directory designation such as c:/pictures.

At step 330, a mirror directory 200(*a*) is designated to correspond to the original memory location and is given a designation such as c:/pictures1 in order to numerically increment the designation to distinguish the mirror memory location from the original starting memory location. At step 330, a determination is made by the recursive file backup program 37 as to whether the designated mirror directory already exists as a memory location. That is, a determination is made as to whether designated mirror memory location such as c:/pictures1 already exists. If that designation already exists, the method proceeds to step 335, and the destination for the mirror memory location is numerically incremented, such as c:/pictures2. The method proceeds back to step 330, and a determination is made as to whether the numerically incremented designation already exists. This process continues until a determination is made that the designated mirror directory name does not correspond to any existing memory location. The method then proceeds to step 340, and the mirror memory location, such as the mirror directory 200(a) is created for potentially saving files modified from the original directory 200.

As step 345, the automated file modification application begins searching the original directory 200 for files requiring modification according to the programming of the automated file modification program 100. At step 350, a determination is made as to whether the end of the designated directory has been reached. If so, the method proceeds to step 395 and ends. If additional files or subdirectories are in the designated starting directory at step 350, the method proceeds to step 355. At step 355, a determination is made as to whether the first located item in the starting directory is a file or subdirectory. If the first located item in the starting directory is a file, the method proceeds to step 360, and a determination is made by the automated file modification application 100 as to whether the first located file requires modification. For example, in accordance with a photographic correction program, a determination may be made as to whether a first photograph file found in the starting directory requires some type of automated color enhancement. If so, the method proceeds to step 375, and the first obtained file is modified according to the automated file modification application 100.

Once the file is modified, the modified file is saved to the mirror memory location corresponding to the original memory location currently being scanned by the automated file modification application. For example, if a file designated as "photograph.pic" is located in the starting directory 200 and is subsequently modified by the file modification application, the modified file is saved in the mirror memory location 200(a) and is given the identical file designation of "photograph.pic" in the mirror memory location. Accordingly, if the user subsequently wishes to review whether any files from the original memory location 200 have been modified, the user needs only to review files contained in the mirror directory "pictures1" for modified files. If any files contained therein, such as "photograph.pic," are not satisfactory to the user, the user may quickly and easily locate the original file in the original directory 200 where the original file has the identical naming designation of "photograph.pic".

After the first obtained file is modified and saved, as described, the method proceeds to step 380, and the automated file modification program 100 continues scanning the first or starting original directory for additional files requiring modification. As should be understood, at step 360, if the first obtained file does not require modification based on the determination by file modification application 100, the method proceeds directly to step 380 whereby the next file contained in the designated starting directory is obtained for modification, if required.

Referring back to step 355, if the first item located in the starting directory 200 is not a file, but is a subdirectory such as the subdirectory 202, illustrated in FIG. 2, the method proceeds to step 365, and a determination is made as to whether the user has selected subdirectories for recursive review and the recursive backup. That is, when the user initially launches the automated file modification application 100, the user may designate a single directory for scanning according to the user's file modification application 100. Alternatively, the user may select that any subdirectories contained in the starting directory and any subdirectories contained in found subdirectories are to be scanned according to the file modification application for modification of files contained in any of those directories or subdirectories. If the user has not designated a review of the first obtained subdirectory 202 in the starting directory 200, the method proceeds to step 380, and the modification application 100 obtains the next file or subdirectory in the starting directory 200.

If at step 365, the user has designated that the first obtained subdirectory 202 in the starting directory 200 is to be reviewed for files potentially requiring modification, the method proceeds to step 370, and a mirror directory 202(a) is created in the mirror directory structure having an identical naming designation, for example "party," as the naming designation of the original directory 202 contained in the original directory structure. As described above, this naming convention is advantageous because modified files, if any, subsequently stored in the mirror directory 202(a) may be readily located by the user because the naming designation for files and subdirectories in the mirror directory structure will be identical to the naming designation of files and subdirectories in the original directory where only the naming designation of the starting directory 200 is numerically incremented, as illustrated in FIG. 2. Once the mirror directory 202(a) is created, the method proceeds back to step 345, and the automated file modification application 100 begins to scan the original subdirectory 202. As described above, if any files are located in the original subdirectory 202 requiring modification, those files are modified and are saved in the mirror subdirectory 202(a) using the identical naming designation as the original files contained in the original subdirectory 202.

As should be understood, the recursive file/subdirectory review and backup may proceed as designated by the user throughout the original directory tree-like memory structure until the end of the original directory structure is reached or until a point is reached from which the user has not instructed further review and/or modification. Accordingly, following the illustration shown in FIG. 2, if the recursive review and file backup functionality of the present invention is utilized to scan through to the original subdirectory 210 to modify a single file designated as "1.pic," the memory location designation for the original file may be, by way of example, "c:/pictures/party/school/dad/1.pic." According to an embodiment of the present invention, the memory location designation for the modified file in the mirror directory may be, by way of example, "c:/pictures1/party/school/dad/1.pic." If the file "1.pic" is the only file modified by the file modification application 100, then the mirror directory structure will be empty, but for the single modified file "1.pic." Accordingly, no additional memory space has been used for needlessly backing up all files contained in the original directory, and processing efficiency has been enhanced. Moreover, if the user now wishes to review files modified during the file modification process, the user may quickly and easily review the mirror directory to determine that the file "1.pic" is contained in the subdirectory "Dad" 210(a). If the user determines that the modified file is not acceptable, the user may quickly and easily locate the original file "1.pic" by simply going to the starting directory that is numerically incremented one increment back from the current mirror directory, for example "pictures" vs. "pictures1," and the user may locate the file "1.pic" and know that the user now has located the file that was modified and saved to the mirror directory 210(a).

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of recursively backing up data files modified by an automated file modification application program on a computer including a processor, comprising:
    in response to launching a file modification application that is configured to automatically modify one or more files by making changes to contents of the file, simultaneously launching a recursive backup program that is configured to perform actions, comprising:
    obtaining a starting computer memory location from which to begin file modification by the file modification program; wherein the starting computer memory location is obtained from a user and wherein the starting memory location is a directory;
    creating a mirror starting computer memory location as a mirror computer memory location of the starting computer memory location; wherein the mirror starting computer memory location is a directory;
    naming the mirror starting computer memory location with the same name as the starting computer memory location plus a designation to distinguish the starting computer memory location from the mirror starting computer memory location; wherein the designation relates to a number of modifications to a file;
    the automated file modification application scanning the starting computer memory location for files requiring modification;
    if a first file located in the starting computer memory location is modified by the automated file modification application, storing the first file unmodified in the starting computer memory location and storing only the modified file in the mirror starting computer memory location, thereby backing up only the modified file; wherein the first file remains stored unmodified in the starting computer memory location and wherein the mirror starting computer memory location contains only modified files;
    providing a notification for notifying a user in response to a storage of a modified file; and after all files contained in the starting computer memory location are modified, if required by the automated file modification application program, locating a first computer sub-memory location in the starting computer memory location; and
    creating a mirror first computer sub-memory location as a mirror computer memory location of the first computer sub-memory location and as a first computer sub-memory location to the mirror starting computer memory location.

2. The method of claim 1, further comprising providing the stored modified file an identical name as the first file located in the starting computer memory location.

3. The method of claim 1, further comprising the steps of:
    scanning the first computer sub-memory location by the automated file modification application program for files requiring modification; and
    if a first file located in the first computer sub-memory location is modified, storing the modified file in the mirror first computer sub-memory location.

4. The method of claim 3, further comprising providing the stored modified file an identical name as the first file located in the first computer sub-memory location.

5. The method of claim 3, further comprising the steps of:
    after all files contained in the first computer sub-memory location are modified, if required by the automated file modification application program, locating a computer sub-memory location of the first computer sub-memory location; and
    creating a mirror computer sub-memory location as a mirror computer memory location of the computer sub-memory location of the first computer memory location and as a computer sub-memory location to the mirror first computer sub-memory location.

6. The method of claim 5, further comprising the steps of:
    scanning the computer sub-memory location of the first computer sub-memory location by the automated file modification application program for files requiring modification; and
    if a first file located in the computer sub-memory location of the first computer sub-memory location is modified, storing the modified file in the mirror computer sub-memory location.

7. The method of claim 1, prior to the step of creating a mirror starting computer memory location as a mirror computer memory location of the starting computer memory location, further comprising selecting a designated mirror starting computer memory location as a corresponding computer memory location for the starting computer memory location.

8. The method of claim 7, further comprising the steps of:
    determining whether the selected designated mirror starting computer memory location is already in use; and
    if the selected designated mirror starting computer memory location is already in use, numerically incrementing the mirror starting computer memory location designation until a mirror starting computer memory location designation not already in use is obtained.

9. The method of claim 6, after all files contained in the sub-memory computer location of the first sub-memory computer location are modified, if required by the file modification application program, further comprising the steps of:
    recursively moving back to the starting computer memory location;
    locating a second computer sub-memory location in the starting computer memory location; and
    creating a mirror second computer sub-memory location as a mirror computer memory location of the second computer sub-memory location and as a second computer sub-memory location to the mirror starting computer memory location.

10. The method of claim 9, further comprising the steps of:
    scanning the second computer sub-memory location by the automated file modification application program for files requiring modification; and
    if a first file located in the second computer sub-memory location is modified, storing the modified file in the mirror second computer sub-memory location.

11. The method of claim 10, further comprising providing the stored modified file an identical name as the first file located in the second computer sub-memory location.

12. The method of claim 10, further comprising the steps of:
    after all files contained in the second computer sub-memory location are modified, if required by the automated file modification application program, locating a computer sub-memory location of the second computer sub-memory location; and creating a mirror computer sub-memory location as a mirror computer memory location of the computer sub-memory location of the second computer sub-memory location and as a computer sub-memory location to the mirror second computer sub-memory location.

13. A computer-storage medium containing instructions which when executed by a computer perform the steps of:

in response to launching a file modification application that is configured to automatically modify one or more files by making changes to contents of the file, simultaneously launching a recursive backup program that is configured to perform actions, comprising:

obtaining a starting computer memory location from which to begin file modification by the file modification program; wherein the starting computer memory location is obtained from a user and wherein the starting memory location is a directory;

creating a mirror starting computer memory location as a mirror computer memory location of the starting computer memory location; wherein the mirror starting computer memory location is a directory;

naming the mirror starting computer memory location with the same name as the starting computer memory location plus a designation to distinguish the starting computer memory location from the mirror starting computer memory location; wherein the designation relates to a number of modifications to a file;

the automated file modification application scanning the starting computer memory location for files requiring modification;

if a first file located in the starting computer memory location is modified by the automated file modification application, storing the first file unmodified in the starting computer memory location and storing only the modified file in the mirror starting computer memory location, thereby backing up only the modified file; wherein the first file remains stored unmodified in the starting computer memory location and wherein the mirror starting computer memory location contains only modified files;

providing a notification for notifying a user in response to a storage of a modified file; and after all files contained in the starting computer memory location are modified, if required by the automated file modification application program, locating a first computer sub-memory location in the starting computer memory location; and creating a mirror first computer sub-memory location as a mirror computer memory location of the first computer sub-memory location and as a first computer sub-memory location to the mirror starting computer memory location.

14. The computer storage medium of claim 13, further comprising providing the stored modified file an identical name as the first file located in the starting memory location.

15. The computer storage medium of claim 13, further comprising the steps of:

scanning the first sub-memory location by the automated file modification application for files requiring modification; and if a first file located in the first sub-memory location is modified, storing the modified file in the mirror first sub-memory location.

16. The computer storage medium of claim 15, further comprising providing the stored modified file an identical name as the first file located in the first sub-memory location.

17. The computer storage medium of claim 16, further comprising the steps of:

after all files contained in the first sub-memory location are modified, if required by the automated file modification application, locating a sub-memory location of the first sub-memory location; and creating a mirror sub-memory location as a mirror memory location of the sub-memory location of the first memory location and as a sub-memory location to the mirror first sub-memory location.

18. The computer storage medium of claim 17, further comprising the steps of:

scanning the sub-memory location of the first sub-memory location by the automated file modification application for files requiring modification; and if a first file located in the sub-memory location of the first sub-memory location is modified, storing the modified file in the mirror sub-memory location.

19. The computer storage medium of claim 13, prior to the step of creating a mirror starting memory location as a mirror memory location of the starting memory location, further comprising selecting a designated mirror starting memory location as a corresponding memory location for the starting memory location.

20. The computer storage medium of claim 19, further comprising the steps of:

determining whether the selected designated mirror starting memory location is already in use; and if the selected designated mirror starting location is already in use, numerically incrementing the mirror starting memory location designation until a mirror starting memory location designation not already in use is obtained.

21. The computer storage medium of claim 17, after all files contained in the sub-memory location of the first sub-memory location are modified, if required by the file modification application, further comprising the steps of:

recursively moving back to the starting memory location;

locating a second sub-memory location in the starting memory location; and creating a mirror second sub-memory location as a mirror memory location of the second sub-memory location and as a second sub-memory location to the mirror starting memory location.

22. The computer storage medium of claim 21, further comprising the steps of:

scanning the second sub-memory location by the automated file modification application for files requiring modification; and if a first file located in the second sub-memory location is modified, storing the modified file in the mirror second sub-memory location.

23. The computer readable medium of claim 22, further comprising providing the stored modified file an identical name as the first file located in the second sub-memory location.

24. The computer storage medium of claim 22, further comprising the steps of:

after all files contained in the second sub-memory location are modified, if required by the automated file modification application, locating a sub-memory location of the second sub-memory location; and creating a mirror sub-memory location as a mirror memory location of the sub-memory location of the second sub-memory location and as a sub-memory location to the mirror second sub-memory location.

* * * * *